Nov. 18, 1952  J. E. McDERMOTT ET AL  2,618,237
POULTRY WATERING DEVICE
Filed April 9, 1949
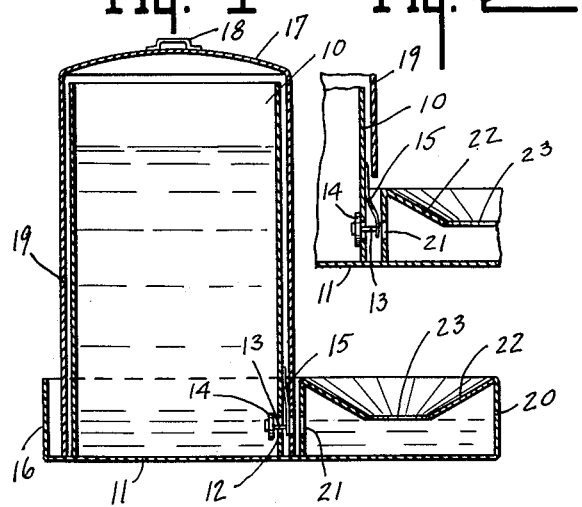
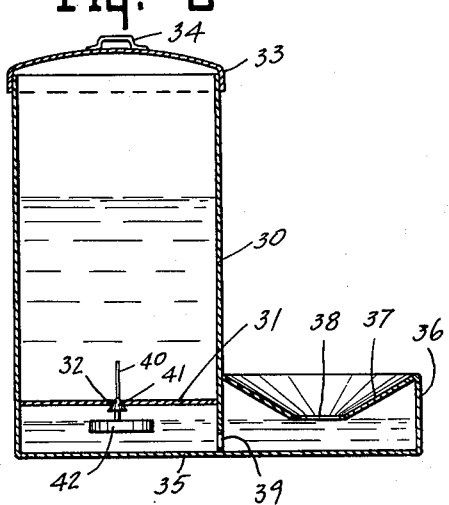
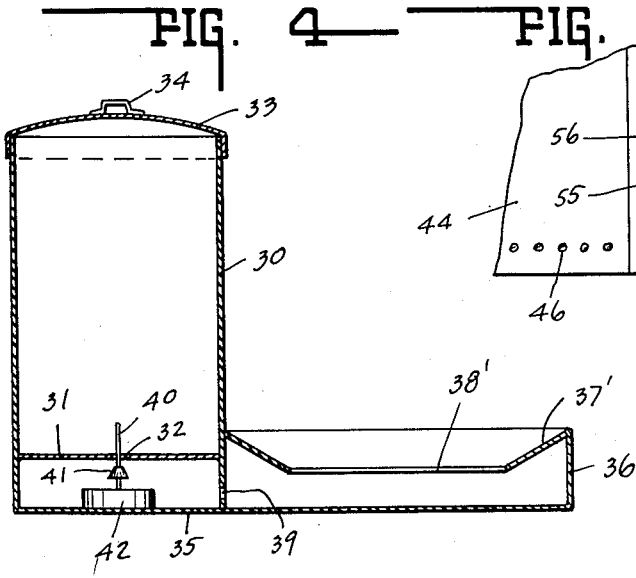
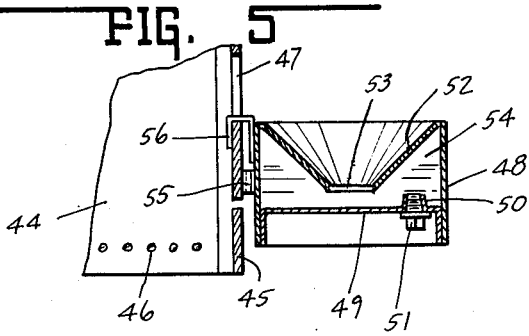
INVENTORS.
JOHN E. McDERMOTT.
WALTER E. GAINEY
BY
Lockwood, Galdsmith & Galt
ATTORNEYS.

Patented Nov. 18, 1952

2,618,237

UNITED STATES PATENT OFFICE 2,618,237

POULTRY WATERING DEVICE

John E. McDermott and Walter E. Gainey, Danville, Ill.

Application April 9, 1949, Serial No. 86,536

1 Claim. (Cl. 119—18)

This invention relates to a watering device for fowls.

One chief object of the present invention is to prevent fowl from contaminating, etc., the area immediately about a watering device.

Another chief object of the present invention is to incorporate the invention in such manner that in the shipment of fowls water will not be lost or spilled even though the shipping crate be turned on its side or turned upside down in the initial placement thereof in the transporting vehicle.

It has heretofore been the experience in the shipment of expensive pedigreed fowl that due to loss of water, failure to water, and/or sloppage, the birds upon arrival at the destination were weak, sick or dead.

Even if water was not lost, due to tipping and handling of the crate, the birds with the usual watering container would drip water about the same and thus wet down the litter making it soggy, etc. Soaked seeds billed into this mess help to further damage the birds. A few "blow flies" complete the damage.

Shipments upon arrival contained many maggots and the mass was seething therewith. In a few days the birds, as a result of eating same, were dead of "Limberneck."

The present invention insures, in shipment, an adequate amount of water at all times. It also prevents contamination of surroundings and insures clean, dry and sanitary surroundings.

Other objects and features of the invention will be set forth more fully hereinafter.

The full nature of the invention will be understood from the accompanying drawings and the following description and claim:

In the drawings Fig. 1 is a longitudinal sectional view of one embodiment of the invention incorporated in a yard or run watering device, parts being shown in the operative position.

Fig. 2 is a similar view of the valve portion of such embodiment and in the closed position.

Fig. 3 is a view similar to Fig. 1 and of a modified form of the invention, the valve being illustrated in cut-off or closed position.

Fig. 4 is a view similar to Fig. 3 and of a slightly modified form of the invention, the valve being illustrated in the supplying or open position.

Fig. 5 is a central sectional view of a portion of a fowl shipping crate with the shipping embodiment of the invention applied thereto.

In Figs. 1 and 2 of the drawings, 10 indicates a tubular member, open at the top and closed at the bottom 11. Herein member 10 is apertured at 12 and disposed therein is valve stem 13 mounting interiorly of said member the sealing valve 14. Stem 13 is rigid at its exterior end with an outwardly directed leaf spring 15 secured at one end to the member exterior.

Herein the bottom 11 is extended and has upturned sides 16 which are spaced from member 10 so that cover 17, having handle 18 and elongated skirt 19 may be telescoped over the member 10. In such action, after the tank (member 10) has been filled, the skirt bears upon spring 15 or stem 13 to open valve 14 permitting tank contents to become subject to pressure controlled discharge.

Formed integral with said rim 16 is a chamber forming wall 20 that immediately adjacent aperture 12 is apertured as at 21. Extending downwardly and inwardly from the upper edge of wall 20 is the return drain cover portion 22 having central opening 23 of appreciable area.

The disposition and slope of said cover wall is such and the distance of opening 23 from the wall 20 is such that the fowl in drinking must have the breast in contact with wall 20. The fowl after billing water elevates neck and head so that the neck is disposed at an angle of 60 degrees. The water runs down the neck and into the chicken and surplus water runs off the bill and drops into the funnel-like top 22 for return to the drinking vessel portion. Thus the area in the immediate vicinity of the device always is dry and sanitary.

As the fowls drink the water from the funnel covered vessel portion, same is automatically replenished from tank 10. The poultryman daily or so need only remove the cover and refill the tank. In this operation initial cover removal removes the constraint upon spring 15 so that it is effective to close the valve during the tank refilling thus preventing the overflowing of the water from the watering funnel covered vessel.

In Fig. 3 there is illustrated a modified form of the invention. Herein 30 is a tubular member with false bottom 31 having aperture 32 therein. The top is closed by skirted cover 33 having handle 34.

Bottom 35 is extended laterally as shown and provided with upturned wall 36. The upper edge thereof is provided with funnel-like cover 37 having central opening 38. Thus there is provided two lower chambers and member 30 includes aperture 39 providing free communication therebetween.

A stem 40 disposed in aperture 32 mounts a conical valve 41 beneath false bottom 31. Said stem at its lower end mounts float 42. As the birds drink water from the funnel covered container the float falls, opening valve 41. When the tank replenishes the water supply, the water level rises therewith and the float also rises to close valve 41 and cut off the water supply.

Reference will now be had to Fig. 4 wherein the embodiment is closely similar to that shown in Fig. 3. However, herein the funnel-covered container is elongated as shown. Hence, all parts are similarly designated except the two which have different dimensions and these are designated by prime designations.

Reference will now be had to Fig. 5. In this figure, 44 indicates one wall of a shipping crate, 45 another wall, and 46 a bottom which may be solid if desired. The wall 45 has opening 47 therein so that the fowl being shipped can obtain access to the drinking vessel.

Herein the vessel includes a cylindrical side wall 48 and disposed near the bottom thereof is the bottom 49 that has a threaded, inwardly directed tubular extension 50 closable by a threaded plug 51. The upper edge of the cylindrical wall 48 is provided with a downwardly and inwardly directed funnel-like forming cover 52 of inverted frusto-conical conformation which defines an opening 53 of limited diameter. The diameter of the opening is substantially less than the diameter of said cover as shown in Fig. 5.

The volume above the opening 53 and within the vessel and designated by the numeral 54 is sufficient so that if the entire crate be inverted no water will be lost from the vessel provided however the vessel is filled only up to the opening. Also if the crate is turned upon any one side, the volume of the water when it flows to the then lowermost portion of the vessel will not flow from the opening 53. Also in the cocking or tilting of the crate in its handling, to wit, removal from the truck and transporting to the express car, etc., and disposition therein and subsequent removal therefrom, will not lose any of the water content.

There is provided upon the exterior of this drinking vessel a resilient bearing element 55. There is provided upon the exterior of this drinking vessel a hook-like resilient member 56. The poultryman in preparing the crate for shipment places the fowl in the crate, fills the drinking vessel with water up to the opening, inverts the vessel and then forces the hook-like member upon the wall 45 at the opening 47 so that the vessel is frictionally gripped thereto and will be retained thereon unless it is forcibly removed therefrom as in long shipments so that the express attendant can remove the drinking vessel from the crate, refill it it and then replace it.

In all forms of the invention the funnel-like cover for the drinking vessel proper is of such character that the fowl cannot dribble water around the outside of the vessel and what water is dribbled from the bill always drains back to the vessel. With this invention birds may be shipped and arrive at their destination in perfect health, etc., and not in the condition initially set forth herein.

The shipping form of this container by exposing only a small area of water surface restricts water loss incident to evaporation.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

The combination with a poultry shipping crate having an opening formed through one wall thereof adjacent the bottom of said crate to permit poultry within said crate to extend their heads therethrough, of a poultry watering device comprising a cylindrical side wall, a bottom wall and a cover, said cover being of inverted frusto-conical conformation having its upper extremity merged with and connected to the upper edge of said side wall, the lower edge of said cover defining a drinking opening of substantially less diameter than the diameter of said cover, said vessel being so formed that its volume within said cover above said opening is at least equal to its volume below said opening, the bottom wall of said vessel being provided with a water drainage opening, closure means engaging said drainage opening, and means to detachably secure said vessel to said crate in substantially horizontal position, said last mentioned means comprising a hook type element connected to the side wall of said vessel and extending outwardly therefrom, said element being adapted to be inserted through the opening in said crate into engagement with the inner wall thereof below said crate opening, and a resilient bearing member connected to said vessel side wall below said element and adapted to engage the outer surface of said crate wall.

JOHN E. McDERMOTT.
WALTER E. GAINEY.

REFERENCES CITED

The following references are of record in the file of this patent:

UNITED STATES PATENTS

| Number | Name | Date |
|---|---|---|
| 341,211 | Beazley | May 4, 1886 |
| 1,012,589 | Blumberger | Dec. 26, 1911 |
| 1,029,320 | Savosick | June 11, 1912 |
| 1,159,190 | Derr | Nov. 2, 1915 |
| 1,215,417 | Scott | Feb. 13, 1917 |
| 1,758,674 | Morton | May 13, 1930 |
| 1,928,103 | Hill | Sept. 26, 1933 |
| 2,075,739 | McFarlane | Mar. 30, 1937 |
| 2,086,341 | Tolley | July 6, 1937 |
| 2,254,584 | Tornell | Sept. 2, 1941 |

FOREIGN PATENTS

| Number | Country | Date |
|---|---|---|
| 13,793 | Great Britain | Aug. 5, 1909 |
| 248,257 | Great Britain | Mar. 4, 1926 |